(12) United States Patent
Rabetge et al.

(10) Patent No.: US 7,587,386 B2
(45) Date of Patent: Sep. 8, 2009

(54) TRANSLATING CASE-SENSITIVE TECHNICAL IDENTFIERS

(75) Inventors: Christian Rabetge, Sinsheim (DE); Otto Boehrer, Am Leimbach (DE)

(73) Assignee: SAP AG, Walldorf (DE)

( * ) Notice: Subject to any disclaimer, the term of this patent is extended or adjusted under 35 U.S.C. 154(b) by 324 days.

(21) Appl. No.: 11/803,642

(22) Filed: May 14, 2007

(65) Prior Publication Data
US 2008/0288549 A1    Nov. 20, 2008

(51) Int. Cl.
*G06F 17/30* (2006.01)
*G06F 17/00* (2006.01)

(52) U.S. Cl. .......................... 707/2; 707/101
(58) Field of Classification Search ............ None
See application file for complete search history.

(56) References Cited

U.S. PATENT DOCUMENTS

| | | | |
|---|---|---|---|
| 7,152,056 B2* | 12/2006 | Snyder | 707/2 |
| 2003/0033595 A1* | 2/2003 | Takagi et al. | 717/143 |
| 2004/0267749 A1* | 12/2004 | Bhat et al. | 707/9 |

* cited by examiner

*Primary Examiner*—Uyen T. Le
(74) *Attorney, Agent, or Firm*—Mintz, Levin, Cohn, Ferris, Glovsky & Popeo, P.C.

(57) ABSTRACT

From a case-sensitive technical identifier referencing a resource and having upper case letters, a bit string is generated. The bit string identifies whether each letter in the case-sensitive technical identifier is upper case or lower case. In addition, the upper case letters in the case-sensitive technical identifier are converted to lower case and are concatenated with the bit string to generate a case-insensitive technical identifier. Related systems, apparatus, methods, and/or articles are also described.

20 Claims, 2 Drawing Sheets

TRANSLATING CASE-SENSITIVE TECHNICAL IDENTFIERS

TECHNICAL FIELD

The subject matter described herein relates to the translation of technical identifiers, such as uniform resource identifiers, from a case-sensitive environment to a case-insensitive environment and vice versa.

BACKGROUND

Technical identifiers, such as uniform resource identifiers (URIs), are compact strings of characters used to identify or name a resource. Web services include or reference technical identifiers that can be case-sensitive and which can include special characters (e.g., symbols, etc.). In web service development environments, pathnames must be created which are case-insensitive and which do not allow for special characters. As a result, pathnames need to be created in the development environment to ensure that different web services can be uniquely identified.

SUMMARY

In one aspect, a case-sensitive technical identifier referencing a resource and having upper case letters is accessed. Thereafter, a bit string based on the case-sensitive technical identifier is generated. The bit string identifies whether each letter in the case-sensitive technical identifier is upper case or lower case. Additionally, upper case letters in the case-sensitive technical identifier are converted to lower case. The converted case-sensitive technical identifier is concatenated with the bit string to generate a case-insensitive technical identifier.

In another aspect, a case-insensitive technical identifier referencing a resource and having no upper case letters is accessed. The case-insensitive technical identifier includes a bit string identifying whether each letter in the case-insensitive technical identifier is upper case or lower case. Thereafter, a length of the bit string is determined so that the bit string can be separated from the letters in the case-insensitive technical identifier. Letters in the case-insensitive technical identifier identified in the bit string can then be converted to upper case to generate the case-sensitive technical identifier.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may encode one or more programs that cause the processor to perform one or more of the operations described herein.

The subject matter described herein provides many advantages. For example, unique filenames (in a case-insensitive file system) can be created that correspond to a URI. Moreover, case-sensitive strings can be converted into URLs which are case-insensitive.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
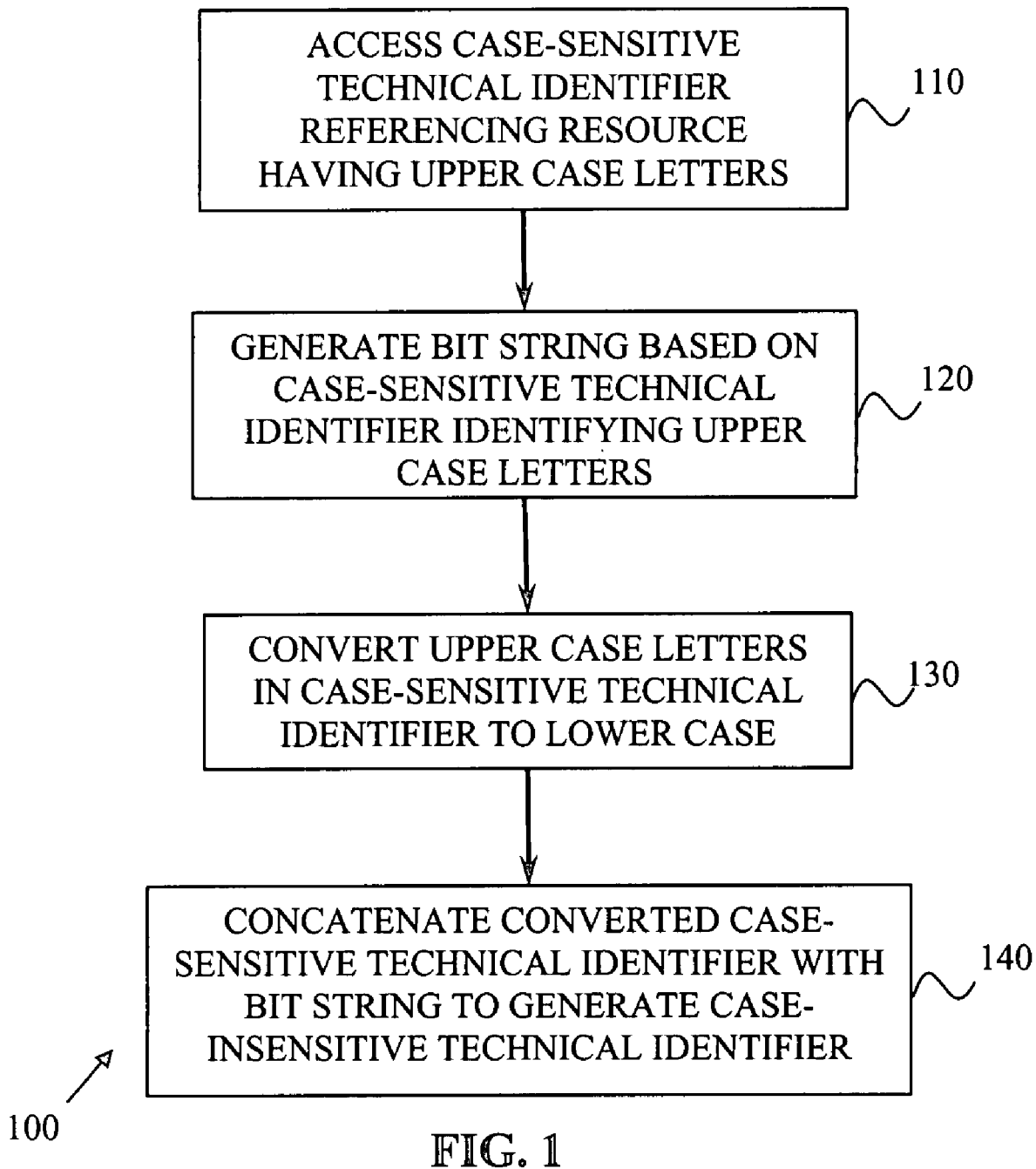
FIG. 1 is a process flow diagram illustrating a conversion of a case-sensitive technical identifier to a case-insensitive technical identifier.

FIG. 1 is a process flow diagram illustrating a method 100 in which, at 110, a case-sensitive technical identifier referencing a resource and having upper case letters is accessed. Thereafter, at 120, a bit string based on the case-sensitive technical identifier is generated. The bit string identifies whether each letter in the case-sensitive technical identifier is upper case or lower case. Additionally, at 130, upper case letters in the case-sensitive technical identifier are converted to lower case. The converted case-sensitive technical identifier is concatenated, at 140, with the bit string to generate a case-insensitive technical identifier.

Figure 2:
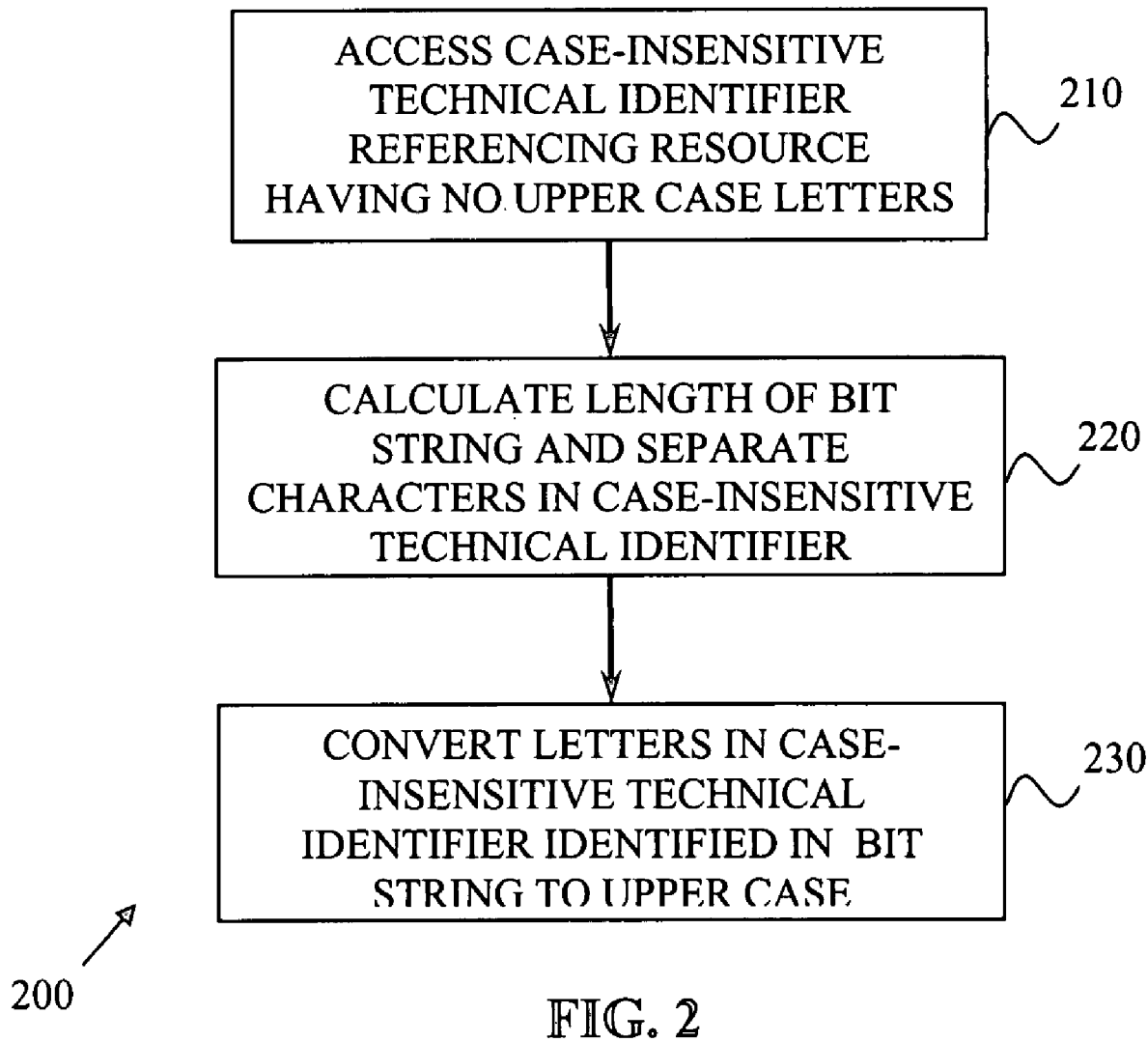
FIG. 2 is a process flow diagram illustrating a conversion of a case-insensitive technical identifier to a case-sensitive technical identifier.

FIG. 2 is a process flow diagram illustrating a method 200 in which, at 210, a case-insensitive technical identifier referencing a resource and having no upper case letters is accessed. The case-insensitive technical identifier includes a bit string identifying whether each letter in the case-insensitive technical identifier is upper case or lower case. Thereafter, at 220, a length for a bit string for a case-sensitive technical identifier corresponding to the case-insensitive technical identifier is determined so that the bit string may be separated from the letters. In addition, at 230, the letters in the case-sensitive technical identifier identified as upper case in the bit string are converted to upper case to generate the case-sensitive technical identifier.

The current systems and techniques allow for the mapping of a case-sensitive technical identifier (i.e., a technical identifier referencing a resource that includes capital or special characters) into a case-insensitive technical identifier (e.g., name, etc.) that does not include special characters. In one implementation, all capital letters of the original character string within the case-sensitive technical identifier are replaced with the corresponding lowercase letters. Blanks and nine supported special characters are treated as capital letters of the ten digits (because digits 0-9 only have a single state).

A bit string is used to describe the character positions where a replacement has taken place. For each character of the original string, the bit string contains a bit with value 1, if the character has been replaced, and a bit with value 0 otherwise. The bit string can be represented as a 32-based number with ten digits of the decimal system and the first 22 characters of the alphabet as 32-based digits. The 32-based number is appended to the converted string. The character string resulting from this concatenation can be used as a replacement for the original string to generate the case-insensitive technical identifier. In some variations, the resulting string includes 20% more characters than the original string.

For the encoding of special characters one can treat a space as the uppercase version of the digit 0 and the following nine other special characters as uppercase versions of the digits 1 to 9:

| Special Character | Corresponding digit as lowercase character |
|---|---|
| : | 1 |
| . | 2 |
| — | 3 |
| # | 4 |
| - | 5 |
| + | 6 |
| / | 7 |
| @ | 8 |
| % | 9 |

For the representation of the bit-string appended at the end of the case-insensitive technical identifier (indicating uppercase characters in the case-sensitive technical identifier) one can use "0" to "9" and "A" to "V" as 32-based digits. Using lower case characters "a" to "v" instead of "A" to "V" is equivalent, but a little bit more difficult to read by human readers.

Each 32-based digit represents 5 binary digits. The following 32-based digits are used in the example below:

| 32-based digit | Decimal value | Corresponding five binary digits |
|---|---|---|
| 0 | 0 | 00000 |
| 1 | 1 | 00001 |
| 2 | 2 | 00010 |
| 8 | 8 | 01000 |
| G | 16 | 10000 |
| I | 18 | 10010 |
| P | 25 | 11001 |

Binary digit '0' means 'lowercase' and binary digit '1' means uppercase.

The length of the bit-string representations depends on the length of the case-sensitive technical identifier. For a case-sensitive technical identifier with n characters the bit-string representation consists of m=(n+4) div 5 32-based digits, where the operator div means integer division without rest. For example, for a case-sensitive technical identifier with 25 characters five 32-based digits for the bit-string representation are required. For a case-sensitive technical identifier with 38 characters, eight 32-based digits for the bit-string representation are required.

On the other hand, one can calculate from the number of characters of a case-insensitive technical identifier, the number of characters of a case-insensitive technical identifier that belong to the bit-string representation. For a case-insensitive technical identifier with m characters the bit-string representation consists of n=(m+5) div 6 characters, where again the operator div means integer division without rest. For example, from a case-insensitive technical identifier with 30 characters the last five characters at the end belong to the bit-string representation. From a case-insensitive technical identifier with 46 characters the last eight characters at the end belong to the bit-string representation.

In one example, the identifier of a Web service interface consists of two parts: the interface name and its namespace, which is a URI. Both parts of the identifier are included in the URL used for the invocation of the Web service. For this inclusion both part of the identifier have to be converted in a case-insensitive form without special characters.

(1) The interface (IF) as it is called in the repository:
IF-namespace: WebSv.Sap.com/xiverI/wsrm_interop_test
IF-name: OneWayPingAndCheckInbound (2) The IF in its converted form:
Converted IF-namespace: http 177xi2com7xiveri7wsrm5interop5test1P20GG20
Converted IF-name: websv2sap2com7xiveri7wsrm5interop5testIP21GG20

(3) A sample resulting URL-path which is using the converted IF name:
/sap/bc/srt/xip/sap/
websv2sap2com7xiveri7wsrm5interop5testIP21GG20/
oneway pingandcheckinboundI8I20/105/
C4A173AF6CEA3489A867461B13C6ACBA/agr__
9C40 FCFBE8733B59A094C0C38C2DE990

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. An article comprising a tangibly-embodied machine-readable medium operable to cause one or more machines to result in operations comprising:
   accessing a case-sensitive technical identifier referencing a resource and having upper case letters;
   generating a bit string based on the case-sensitive technical identifier, the bit string identifying whether each letter in the case-sensitive technical identifier is upper case or lower case;
   converting the upper case letters in the case-sensitive technical identifier to lower case; and
   concatenating the converted case-sensitive technical identifier with the bit string to generate a case-insensitive technical identifier.

2. An article as in claim 1, wherein the article is further operable to cause one or more machines to result in operations comprising:
   storing the case-insensitive technical identifier to allow access to the resource in a case-insensitive environment.

3. An article as in claim 1, wherein the case-sensitive technical identifier further includes numbers and up to ten special characters, and wherein upper case numbers in the bit string correspond to the ten special characters.

4. An article as in claim 3, wherein one of the ten special characters corresponds to a blank.

5. An article as in claim 1, wherein the case-insensitive technical identifier characterizes a file name.

6. An article as in claim 1, wherein the case-sensitive technical identifier is a uniform resource identifier.

7. An article as in claim 1, wherein the article is further operable to cause one or more machines to result in operations comprising:
   transmitting the case-insensitive technical identifier to a requesting node to allow access to the resource in a case-insensitive environment.

8. A computer-implemented method comprising:
   accessing a case-sensitive technical identifier referencing a resource and having upper case letters;
   generating a bit string based on the case-sensitive technical identifier, the bit string identifying whether each letter in the case-sensitive technical identifier is upper case or lower case;
   converting the upper case letters in the case-sensitive technical identifier to lower case; and
   concatenating the converted case-sensitive technical identifier with the bit string to generate a case-insensitive technical identifier.

9. A method as in claim 8, further comprising:
   storing the case-insensitive technical identifier to allow access to the resource in a case-insensitive environment.

10. A method as in claim 8, wherein the case-sensitive technical identifier further includes numbers and up to ten special characters, and wherein upper case numbers in the bit string correspond to the ten special characters.

11. A method as in claim 10, wherein one of the ten special characters corresponds to a blank.

12. A method as in claim 8, wherein the case-insensitive technical identifier characterizes a file name.

13. A method as in claim 8, wherein the case-sensitive technical identifier is a uniform resource identifier.

14. A method as in claim 8, further comprising transmitting the case-insensitive technical identifier to a requesting node to allow access to the resource in a case-insensitive environment.

15. An article comprising a tangibly-embodied machine-readable medium operable to cause one or more machines to result in operations comprising:
   accessing a case-insensitive technical identifier referencing a resource and having no upper case letters, the case-insensitive technical identifier including a bit string identifying whether each letter in the case-insensitive technical identifier is upper case or lower case;
   determining a length of the bit string and separating the bit string from the letters in the case-insensitive technical identifier; and
   converting letters in the case-insensitive technical identifier identified in the bit string to upper case to generate the case-sensitive technical identifier.

16. An article as in claim 15, wherein the article is further operable to cause one or more machines to result in operations comprising:
   storing the case-sensitive technical identifier to allow access to the resource in a case-sensitive environment.

17. An article as in claim 15, wherein the case-sensitive technical identifier further includes numbers and up to ten special characters, and wherein upper case numbers in the bit string correspond to the ten special characters.

18. An article as in claim 17, wherein one of the ten special characters corresponds to a blank.

19. An article as in claim 15, wherein the case-insensitive technical identifier characterizes a file name.

20. An article as in claim 15, wherein the case-sensitive technical identifier is a uniform resource identifier.

* * * * *